(12) United States Patent
Krajnc et al.

(10) Patent No.: US 12,235,345 B2
(45) Date of Patent: Feb. 25, 2025

(54) PAIR-ASSIGNMENT OF RF-SENSING NODES FOR A RF CONTEXT-SENSING ARRANGEMENT

(71) Applicant: SIGNIFY HOLDING B.V., Eindhoven (NL)

(72) Inventors: Hugo Jose Krajnc, Eindhoven (NL); Peter Deixler, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 415 days.

(21) Appl. No.: 17/772,389

(22) PCT Filed: Oct. 23, 2020

(86) PCT No.: PCT/EP2020/079915
§ 371 (c)(1),
(2) Date: Apr. 27, 2022

(87) PCT Pub. No.: WO2021/089345
PCT Pub. Date: May 14, 2021

(65) Prior Publication Data
US 2022/0413117 A1    Dec. 29, 2022

Related U.S. Application Data

(60) Provisional application No. 62/929,979, filed on Nov. 4, 2019.

(30) Foreign Application Priority Data

Nov. 20, 2019   (EP) .................................. 19210410

(51) Int. Cl.
G01S 13/56   (2006.01)
G01S 7/41    (2006.01)
G01S 13/04   (2006.01)

(52) U.S. Cl.
CPC .............. *G01S 13/56* (2013.01); *G01S 7/412* (2013.01); *G01S 13/04* (2013.01)

(58) Field of Classification Search
CPC .......... G01S 13/56; G01S 7/412; G01S 7/414; G01S 7/415; G01S 13/04; G01S 13/878;
(Continued)

(56) References Cited

U.S. PATENT DOCUMENTS 6,466,125 B1 * 10/2002  Richards ................. G01S 13/42
                                                340/573.4
8,068,051 B1 * 11/2011  Osterweil ............... G01S 7/006
                                                340/573.5
(Continued)

FOREIGN PATENT DOCUMENTS

DE         102014211237 A1   12/2015

*Primary Examiner* — Peter M Bythrow (57) ABSTRACT

The invention is related to a pair-assignment device (100) comprising a sensing-node position ascertainment unit (102) configured to ascertain position information (P.I.) pertaining to respective positions of external RF-sensing nodes (104, 106) with respect to a predefined sensing volume (108) of a RF context-sensing arrangement and a pair-assigning unit (110) configured to assign, using the ascertained position information, at least one transmitter-receiver pair among the individual RF-sensing nodes of the RF context-sensing arrangement to perform a RF context-sensing function, to assign to the RF sensing nodes of the given transmitter-receiver pair a transmitter role (Tx) and a receiver role (Rx), respectively. The pair-assignment device then provides pair information indicative of the at least one assigned transmitter-receiver pair and the assigned transmitter and receiver roles and thus enables an increase of tolerance of the RF context-sensing arrangement against changes in the position of movable objects.

10 Claims, 8 Drawing Sheets

(58) Field of Classification Search
CPC .... G01C 21/3664; G06F 3/017; H04W 12/63;
H04W 12/68; H04W 4/021; H04W 4/023;
H04W 4/029; G01V 3/12
See application file for complete search history.

(56) References Cited

U.S. PATENT DOCUMENTS

| | | | | |
|---|---|---|---|---|
| 8,330,645 | B2* | 12/2012 | Gurevich | G01S 13/003 |
| | | | | 342/59 |
| 10,321,275 | B1* | 6/2019 | Orlov | H04W 4/025 |
| 11,516,625 | B2* | 11/2022 | Lagace | G01S 13/46 |
| 2004/0075605 | A1* | 4/2004 | Bradford | G01S 13/878 |
| | | | | 342/96 |
| 2004/0080415 | A1 | 4/2004 | Sorensen | |
| 2008/0165046 | A1* | 7/2008 | Fullerton | G01S 7/003 |
| | | | | 342/21 |
| 2013/0141233 | A1* | 6/2013 | Jacobs | G08B 21/043 |
| | | | | 340/521 |
| 2017/0366938 | A1* | 12/2017 | Wootton | H04B 17/27 |
| 2018/0102858 | A1 | 4/2018 | Tiwari et al. | |
| 2018/0143024 | A1* | 5/2018 | Kay | H04W 4/029 |
| 2018/0292520 | A1* | 10/2018 | Bermudez | F24F 11/30 |
| 2018/0317047 | A1* | 11/2018 | Hu | G01S 5/14 |
| 2019/0051342 | A1* | 2/2019 | Wootton | G11C 11/2255 |
| 2019/0094353 | A1* | 3/2019 | Davis | G01S 13/87 |
| 2021/0185485 | A1* | 6/2021 | Deixler | H04W 4/80 |
| 2021/0321222 | A1* | 10/2021 | Lagace | G01S 13/56 |
| 2022/0210715 | A1* | 6/2022 | Deixler | H04L 41/0816 |

\* cited by examiner

PAIR-ASSIGNMENT OF RF-SENSING NODES FOR A RF CONTEXT-SENSING ARRANGEMENT

CROSS-REFERENCE TO PRIOR APPLICATIONS

This application is the U.S. National Phase application under 35 U.S.C. § 371 of International Application No. PCT/EP2020/079915, filed on Oct. 23, 2020, which claims the benefits of European Patent Application No. 19210410.7, filed on Nov. 20, 2019 and U.S. Application No. 62/929,979, filed Nov. 4, 2019. These applications are hereby incorporated by reference herein.

FIELD OF THE INVENTION

The present invention is directed to a pair-assignment device for use in an RF context sensing arrangement, to a context-sensing control device, to an RF context-sensing arrangement, to methods for controlling operation of a pair-assignment device, of a context-sensing control device and of an RF context-sensing arrangement, and to a computer program.

BACKGROUND OF THE INVENTION

US 2019/0051342 A1 discloses systems and methods for detecting or sensing the presence of a body without fiducial elements, using signal absorption, and signal forward and reflected backscatter of radiofrequency waves caused by the presence of a biological mass in a communication network comprising RF-sensing nodes.

DE102014211237A1 discloses a method for detecting a state of a room. The method comprises the steps of assigning at least one time slot to each radio device of a second plurality of radio devices arranged in or at the space; transmitting a radio signal into the space (R) through each of the radios within the time slots assigned to the radio; receiving the transmitted radio signals by at least a portion of the radio devices; determining, by each radio device, a channel information value indicative of a signal strength of the received radio signal; associating, by each wireless device (12-$i$), each particular channel information value with a pair of wireless devices based on the allocated time slots; and detecting (S09) based on the channel information values associated with the pairs of wireless devices and using a predetermined evaluation model, the state of the space (R) in real time.

SUMMARY OF THE INVENTION

RF context-sensing arrangements typically depend on comparing current values of a predetermined RF-signal metric, which is influenceable by the presence of biological mass within a sensing volume, with previously established baseline or reference values. Baselines are associated to a given pair of RF-sensing nodes formed by an RF-sensing node operating as a transmitter and another RF-sensing node operating as a receiver, i.e., to a given wireless communication link between two different RF-sensing nodes.

A presence of movable objects within the sensing volume may affect the performance of a RF context-sensing arrangement such as a presence-sensing arrangement. Although RF-signals are capable of penetrating through objects, the relative attenuation the RF-signals suffer is also influenced by the sensing volume and the objects or subjects located therein, e.g. how close the objects are to the transmitter or to the receiver. The RF-signal can reach the receiver from the transmitter via multiple paths before being properly decoded. If there is an object close to the transmitter, then at least some of the paths from transmitter to receiver are affected by the object, and thus attenuated. If, on the other hand, the object is farther away, then the attenuation the RF-signal suffers while going through it is the same, but there are other paths which do not go via the object, e.g. bounce on walls and dodge the object, and are therefore not attenuated. As the receiver collects all these paths, an object farther away from the transmitter is also seen as if it had less attenuation. The opposite is also valid: an object very far from the transmitter but very close to the receiver will cause a higher attenuation, since regardless of which path the signals took a significant part of them will to go through the object before proper reception. In other words, RF-signals transmitted from a transmitter (or received by a receiver) located very close to a given object are received with a higher attenuation than if the object was located further away.

Since the performance of RF context-sensing arrangements depends on how accurately the baseline values represents the sensing volume, and the RF-signals are influenced by the presence of objects within their propagation paths, it would be beneficial to enable an increase of tolerance of an RF context-sensing arrangement against changes in the position of movable objects.

According to a first aspect of the present invention, a pair-assignment device is disclosed. The pair-assignment device comprises a sensing-node position ascertainment unit which is configured to ascertain position information pertaining to respective positions of external RF-sensing nodes with respect to a predefined sensing volume of a RF context-sensing arrangement.

The pair-assignment device further comprises a pair-assigning unit that is connected to the sensing-node position ascertainment unit and that is configured to assign, using the ascertained position information, at least one transmitter-receiver pair among the individual RF-sensing nodes of the RF context-sensing arrangement to perform an RF context-sensing function, to assign to the RF sensing nodes of the given transmitter-receiver pair a transmitter role and a receiver role, respectively, and to provide pair information indicative of the at least one assigned transmitter-receiver pair and the assigned transmitter and receiver roles.

In RF context-sensing arrangements comprising n transceivers acting as RF-sensing nodes, each of the transceivers being communicatively connected to all other transceivers, $n!/(n-2)!$ different wireless communication links are in principle available for performing the RF presence-sensing function, since each of the RF-sensing node can either adopt a transmitter role or a receiver role. The pair-assignment device is advantageously configured to assign one or more suitable transmitter-receiver pairs for performing an RF context-sensing function based on the ascertained position information. This way, an increase of the reliability of the result of the RF context-sensing function can be achieved.

In the following, embodiments according to the first aspect of the invention will be described.

Context-awareness or context-sensing, in computer science, refers to the idea that devices can both sense and react based on their environment. Devices may have information about the circumstances under which they are able to operate and based on rules, or an intelligent stimulus, react accordingly. Context-aware devices may also try to make assumptions about the user's current situation. Context is commonly defined as "any information that can be used to characterize the situation of an entity".

RF context-sensing arrangements and corresponding sensing functions are directed, in different embodiments, to presence-sensing, breathing detection, sleep detection, in particular REM vs. non-REM detection, fall detection, etc. Depending on the technology used by the corresponding arrangement, gestures and heartbeat can be detected using a suitable RF context-awareness arrangement, such as for instance an arrangement using RF-signals according to a 60 GHz WiFi communication protocol for the RF context-sensing function.

In another embodiment, the pair-assigning unit is further configured to assign to the RF sensing nodes of the given transmitter-receiver pair both the transmitter role and the receiver role. In this embodiment, both RF-sensing nodes of the assigned transmitter-receiver pair are assigned both roles so that each of the RF-sensing nodes is capable of performing the RF context-sensing function based on the RF-signal provided by the other RF-sensing node. Therefore, in this embodiment, it is not always one of the RF-sensing nodes of the assigned pair solely transmitting and the other RF-sensing node receiving, and a given transmitter-receiver pair gives raise to two distinct communication links for performing the context-sensing function. In a particular embodiment, the transmitter and receiver role assigned to the RF-sensing nodes of a given transmitter-receiver pair are changed dynamically, so that the RF-sensing nodes take turn transmitting and receiving for performing the context-sensing function.

Suitable position information pertaining to the external RF-sensing nodes with respect to a predefined sensing volume of a RF context-sensing arrangement is any information indicative of a position of the RF-sensing node within the sensing volume. It may, for instance, be indicative of a height (relative to a floor) at which the RF-sensing nodes are installed. Position information may for example include labels associated to the RF-sensing node, the labels being indicative of the position at which the RF-sensing node is located. Examples of such labels include, but are not limited to "wall switch", "table light" or "desk light", indicating that the RF-sensing node is a switch on a wall or that it is a light located on a table or a desk, and thus probably located at waist or chest-height; "fire-sensor", "high-bay luminaire" or "exit sign", indicating that the RF-sensing node is located at approximately ceiling height; "socket", "flood sensor", indicating that the RF-sensing node is probably located close to the floor; "wardrobe", "drawer", indicating that the RF-sensing node is located inside a piece of furniture that can be open or closed, etc. Also, labels such as "battery-powered device" or "swing-arm lamp" indicate that the associated device is a movable device, whose position within the sensing volume can be changed during operation.

An embodiment of the pair-assignment device advantageously includes a label storage where labels are associated to an expected position.

In an embodiment, the position information is determined by the pair-assignment device by evaluating one or more images of the sensing volume and identifying the relative positions of the RF-sensing nodes, with respect to other RF-sensing nodes. Preferably, the image is a photographic image or a combination of photographic images forming a panoramic image of the sensing volume, and the evaluation is performed by a suitable software, either automatically based on object-recognition algorithms or based on user input or a combination of both. For instance, either the software and/or the user can associate the objects represented in the image to suitable labels and localize the positions of the RF-sensing nodes within the sensing volume. Information regarding a size or dimensions of the sensing volume is also determined by the software or by means of user input. In a particular embodiment the image is provided by a 3D time of flight camera, where size information of the sensing volume is readily extractable from the image. In another particular embodiment, the relative locations of the lights are provided by the room mapping application utilizing the camera of an external device such as, but not limited to a robot vacuum cleaner.

In an alternative preferred embodiment, the position information is received by the pair-assignment device from an external source of position information, for instance from a commissioning device. In this embodiment, the pair-assignment device comprises an input unit connected to the sensing-node position ascertainment unit and configured to receive position-input data indicative of the position information.

The position information thus enables, by using suitable selection rules, a selection of those transmitter-receiver pairs which are less influenceable by, or more tolerant to, possible movements of objects within the sensing volume.

In an embodiment, the pair-assignment device further comprises an output unit configured to provide an assigned-pair signal indicative of the pair information. The assigned-pair signal is, in an embodiment, provided to the RF-sensing nodes, so that they are aware of whether or not they have been assigned a role, i.e., a transmitter or a receiver role. In another embodiment, the assigned-pair signal is provided to an external control device for controlling the performance of the RF context-sensing function in a context-sensing arrangement.

In another embodiment, the pair-assignment device further comprises an environment-information ascertainment unit configured to ascertain environment information pertaining to one or more objects present in the sensing volume. In embodiments comprising an environment-information ascertainment unit, the pair-assigning unit is further connected to the environment-information ascertainment unit and configured to assign the at least one transmitter-receiver pair and the transmitter and receiver role also using the ascertained environment information.

Suitable environment information is indicative of a number and respective position of objects within the sensing volume. Preferably it is also indicative of a material of which the object is made and confidence level of a possibility of the object being moved or static. The environment information can be provided by analyzing a panoramic image and labeling the objects in said image or by using a 3D time-of-flight camera. Environment information may for example include labels associated to the objects, the labels being indicative of the nature of the object, the material, the size or any combination thereof.

The environment information is, in a particular embodiment, determined by the environment-information ascertainment unit for example by evaluating one or more images of the sensing volume and identifying the objects located within. In an alternative preferred embodiment, the environment information is received by the pair-assignment device from an external device, for instance from a commissioning device. In this embodiment, wherein the environment information is received from an external device, the pair-assignment device comprises an input unit that is connected to the environment-information ascertainment unit and configured to receive position-input data indicative of the position information. The input unit is, in a preferred embodiment, the same input unit that is also used for receiving the position information.

The environment information is, in another embodiment, alternatively or additionally provided by additional data sources. An example of a suitable additional data source is a microphone that acoustically monitors a certain volume. Such monitoring data provided by microphones can be used to determine whether or not certain predetermined events with potential influence on the RF context-sensing function have taken place. For instance, the data source may receive a signal from a microphone and identify, for instance using pre-stored microphone data patterns, that a car is entering a garage or that a large piece of furniture is being shifted in a particular room, or that a door to a given room is being opened or closed, and provide environment information indicative thereof. Alternatively, the environment information is provided by a surveillance system such as an indoor security camera system.

Typical actions which are expected to be taken in the sensing volume can also have an effect on the RF context-sensing function. For instance, using a transmitter-receiver pair formed by RF-sensing nodes that, according to the ascertained position information, are located at chest-height is in principle preferred since it maximizes the chance of detecting a person in the sensing volume by providing a highest signal-to-noise ratio for accurate detection, for instance for breathing or heart rate detection. However, if the sensing volume is for instance an office, it can be expected that the room has many monitors, laptops, drawers, piles of documents, etc., all situated also at waist- or chest height and therefore potentially affecting the RF sensing function when using RF-sensing nodes located at waist- or chest-height. In office spaces people tend to spend time seated. Therefore, assigning transmitter-receiver pairs located close to the floor potentially yields richer or more sensitive data for performing the RF context-sensing function. In other embodiments, however, transmitter-receiver pairs are assigned wherein one RF-sensing node is close to the floor and the other RF-sensing node is close to the ceiling.

Furthermore, in an embodiment, the environment-information ascertainment unit is further configured to ascertain intended-use information indicative of an intended use of the sensing volume. In this embodiment, the pair-assigning unit is further configured to assign the at least one transmitter-receiver pair and the transmitter and receiver role also using the intended-use information. The intended-use information is preferably provided as a label, such as "office", "bedroom", "living room", "parking lot", etc., and use for determining the at least one transmitter-receiver pair.

The intended-use information is, in another embodiment, used to suitably assign a transmitter-receiver pair also based on an expected occupancy of the rooms. For instance, when a user is not in a room but a pet, e.g. a cat, can still move freely in the room or rooms, the pair-assignment device is configured to assign another transmitter-receiver pair more suitable for the detection of the pet.

A second aspect of the present invention is formed by a context-sensing control device. The context-sensing control device comprises a pair-assignment device according to the first aspect of the invention. The context-sensing control device also comprises a baseline storage unit configured to store, for the at least one transmitter-receiver pair, a baseline associated thereto for performing the RF context-sensing function.

The context-sensing control device further comprises a context-determination unit that is connected to the baseline storage unit and to the pair-assignment device. The context-determination unit is configured to ascertain a signal quality value indicative of a predetermined RF-signal metric of an RF-signal received by that RF-sensing node having the receiver role and sent by that RF-sensing node having the transmitter role, the RF-signal metric being influenceable by a presence of a living being in the sensing volume. The context-determination unit is further configured to determine, using the ascertained signal quality value, and the corresponding baseline, whether a predetermined context-situation has occurred or is currently occurring.

The context-sensing control device of the second aspect shares the advantages of the pair-assignment device of the first aspect. Embodiments of the context-sensing control device include the additional features of the pair-assignment device of the first aspect.

In the following, further embodiments of the context-sensing control device of the second aspect of the invention will be described.

The baseline is, in a particular embodiment, a single value. In alternative embodiments, the baseline values associated to n RF-sensing nodes are stored as an n×n matrix, or an n×n×T matrix in embodiments wherein the baseline value is associated to a certain period T.

In an embodiment, the context-sensing control device includes the pair-assignment device, which is integrated into a same housing. In an alternative embodiment, the pair-assignment device is not physically integrated into the same housing but a separate device which is in communicating connection with the context-determination unit.

In one embodiment, the predetermined RF-signal metric is a received signal strength indication (RSSI) value, which is a value indicative of an estimated measure of power level that an RF-sensing node is receiving from another RF sensing node. In alternative embodiments, the RF-signal metric is additionally or alternatively indicative of an error rate value or a metric based on information accessible via a given channel state information CSI, e.g. line of sight component, channel gain, etc.

In an embodiment, the predetermined context-situation is whether or not a subject, such as a person, is present or moving in the sensing volume, i.e., the context-awareness sensing function is a presence-sensing function, and the context-determination unit is a presence-determination unit. In alternative embodiments, the predetermined context-situation include breathing, sleep-state, fall, gesture, heartbeat, etc.

In a particular embodiment, the baseline storage unit is further configured to store a plurality of baseline determined at different points in time and associated to a respective different position of the one or more objects present in the sensing volume and to a respective transmitter-receiver pair. In this embodiment, the detection determination unit is configured to determine a plurality of detection events using the signal quality value and a respective one of the plurality of stored baselines associated to the transmitter receiver pair and to determine whether the predetermined context-situation has occurred or is currently occurring, such as for instance whether a subject is present in the sensing volume, using the plurality of determined detection events.

For instance, and in order improve the reliability of the result of the RF context-awareness sensing function, in particular an RF-presence-sensing function, during a commissioning phase, several baselines are determined and stored for one or more pairs of RF-sensing nodes, preferably taking into account both the transceiver and the receiver role for each of the RF-sensing nodes of the given pair. Each baseline is determined at a different point in time and associated to a respective different position of the one or more objects present in the sensing volume. This means that at least one pair has a plurality of associated baselines, one for each of the different spatial configuration of the objects within the sensing volume and wherein the different positions of the objects, such as pieces of furniture, will have an effect on the baseline determined in each case. The detection determination unit of the presence sensing control device is advantageously configured, while performing the RF context-sensing function, to determine a plurality of detection events using the signal quality value and a respective one of the plurality of stored baselines associated to the transmitter receiver pair assigned by the pair-assignment device. A detection event is determined when, for a given baseline of the plurality of baselines associated to a pair of RF-sensing nodes, an ascertained signal quality value is indicative of the presence of a subject if that pair of RF-sensing nodes is the assigned transceiver-receiver pair. The context-sensing control device is configured to determine whether a predetermined context-situation has occurred, for instance, whether subject is present in the sensing volume, using the plurality of determined detection events.

In a particular embodiment, the context-sensing control device is configured to use the plurality of determined detection events with respective predetermined weighing factors indicative of how likely each of the scenarios associated to each baseline is to occur during an expected usage of the sensing volume. Additionally, or alternatively, in another embodiment, some of the pairs of RF-sensing nodes and the respective baseline can be used as a back-up, such that, when in doubt, i.e., when the ascertained signal quality value is within a predetermined uncertainty range around the baseline, the RF presence sensing function can be complemented to confirm or reject a detection assumption, using other baselines associated to the pair of transmitter-receiver pair.

According to a third aspect of the present invention, an RF context-sensing arrangement is described. The RF context-sensing arrangement comprises at least two RF-sensing nodes configured to transmit and receive RF-signals and to determine and provide a signal quality value indicative of a predetermined RF-signal metric of an RF-signal received by the respective RF-sensing node, and a context-sensing control device according to the second aspect of the invention.

The RF context-sensing arrangement of the third aspect thus shares the advantages of the pair-assignment device of the first aspect or any of its embodiments and of the context-sensing control device of the second aspect or of any of its embodiments.

In the following, embodiments of the RF context-sensing arrangement will be described.

In a preferred embodiment, the RF context-sensing arrangement is an RF-controlled lighting arrangement. The RF-sensing nodes of this embodiment not only perform the RF sensing function, but also form luminaires or lighting devices, switches, sensors such as temperature sensors, humidity sensors, window or door sensors, smoke detectors, access points, etc. The operation of such RF-sensing nodes is preferably controllable wirelessly, and control signals transmitted over a wireless communication network at the same time are used as the RF-signals from which the value of the RF-signal metric is determined. The assignment of transmitter and receiver roles applies to the context-sensing function and not necessarily to a communication function between the RF-sensing nodes, i.e., the RF-signal nodes are capable of communicating with each other for performing the communication function, but only those RF-signals provided by the RF-sensing node of a given transmitter-receiver pair having the transmitter role and received by that RF-sensing node of the pair having the receiver role is used for the context-sensing function.

In an embodiment only those RF-sensing nodes that have been assigned as receivers of a given transmitter-receiver pair provide the signal quality value, when an RF-signal is received from the RF-sensing node that has been assigned as the transmitter of that transmitter-receiver pair. The RF-sensing nodes are aware of the roles assigned because they have directly received the assigned pair signal or because they have been instructed accordingly by another device, such as a hub. The context-determination unit then receives the signal quality value, and, using the corresponding baseline stored, determines whether a predetermined context-situation has occurred or is currently occurring, such as, for instance, the presence or not of a person in the sensing volume. This embodiment reduces the amount of signals provided to the context-determination unit but increases the complexity of the RF-sensing nodes.

In an alternative embodiment, the RF-sensing nodes provide the signal quality value determined with information pertaining to the transmitting RF-sensing node that has transmitted the RF-signal from which the signal quality value has been determined. The context-determination unit receives all of the signal quality values, but uses, for the RF context-sensing function, only those provided by the RF-sensing node of the assigned transmitter-receiver pair or pairs having the receiver role in response to RF-signals provided by that RF-sensing node of the respective assigned transmitter-receiver pair having the transceiver role. In this embodiment, the RF-sensing nodes provide the signal quality value independently of the assigned role, if any, thus reducing the complexity. However, the presence-detection unit is comparatively more complex since it has to select the suitable signal quality values for performing the RF context-sensing function.

In another embodiment, the RF-sensing node having the transmitter role is further configured to determine and provide a signal quality value indicative of a predetermined RF-signal metric of an RF-signal provided and received by itself, i.e. an echo RF-signal. This is typically not desired for communication function since it creates additional overhead, but it is suitable for improving signal quality determination by having additional relevant data. In the detection of fast events (e.g. people falling, gesture detection, etc.) such fast generation of data is particularly advantageous. In this embodiment, corresponding baselines for such echo RF-signals are also determined and stored. In a particular embodiment, the RF-sensing node or nodes suitable for determining the signal quality value of echo RF-signals is a WiFi-compatible device, such as a WiFi mesh router, that is configured to concurrently talk on a first radio channel and receive on a second radio channel different from the first radio channel.

A fourth aspect of the present invention is formed by a method for operating a pair-assignment device, in particular for use in an RF context-sensing arrangement. The method comprises ascertaining position information pertaining to respective positions of external RF-sensing nodes with respect to a predefined sensing volume of a RF context-sensing arrangement;

assigning, using the ascertained position information, at least one transmitter-receiver pair among the individual RF-sensing nodes of the RF context-sensing arrangement to perform a RF context-sensing function and assigning to the RF sensing nodes of the given transmitter-receiver pair a transmitter role and a receiver role, respectively; and providing pair information indicative of the at least one assigned transmitter-receiver pair and the assigned transmitter and receiver roles.

In an embodiment of the method of the fourth aspect, the method further comprises ascertaining environment-information pertaining to one or more objects present in the sensing volume and assigning the at least one transmitter-receiver pair and the transmitter and receiver role also using the ascertained environment information.

A fifth aspect of the present invention is formed by a method for operating a context-sensing control device. The method comprises:

performing the method of the fourth aspect of the invention;

storing, for the at least one transmitter-receiver pair, a baseline associated thereto;

ascertaining a signal quality value indicative of a predetermined RF-signal metric of an RF-signal received by that RF-sensing node having the receiver role and sent by that RF-sensing node having the transmitter role, the RF-signal metric being influenceable by a presence of a living being in the sensing volume; and determining, using the ascertained signal quality value, and the corresponding baseline, whether a predetermined context-situation has occurred in the sensing volume.

A sixth aspect of the invention is formed by a method for operating an RF context-sensing arrangement. The method comprises:

performing the method of the fourth aspect of the invention;

determining and providing a signal quality value indicative of a predetermined RF-signal metric of at least an RF-signal received by the RF-sensing node of the transmitter-receiver pair having the receiver function and provided by the RF-sensing node of the transmitter-receiver pair having the transmitter function;

storing, for the at least one transmitter-receiver pair, a baseline associated thereto;

ascertaining a signal quality value indicative of a predetermined RF-signal metric of an RF-signal received by that RF-sensing node having the receiver role and sent by that RF-sensing node having the transmitter role, the RF-signal metric being influenceable by a presence of a living being in the sensing volume; and determining, using the ascertained signal quality value, and the corresponding baseline, whether a predetermined context-situation has occurred in the sensing volume.

The methods of the fourth, fifth and sixth aspect of the invention thus share the advantages of the pair-assignment device, the context-sensing control device and the RF context-sensing arrangement of the first, second and third aspects of the invention respectively.

According to a seventh aspect of the present invention a computer program is disclosed. The computer program comprises instructions which, when the program is executed by a computer, cause the computer to carry out the method of the fourth aspect of the invention.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

RF context-sensing is a technology that allows detection of predetermined context-situations such as motion, presence or occupancy in a reliable way based on how living beings, in particular human, affect or disturb wireless signals transmitted among a group of RF sensing-nodes, including transmitter nodes, receiver nodes, transceiver nodes or any combination thereof, acting as RF sensing-nodes. An RF context-sensing function is ultimately based in comparing a currently determined RF-signal metric, such as a received signal strength indication RSSI value, or an error rate vale or a metric based on information accessible via a given channel state information CSI, e.g. line of sight component, channel gain, etc., to a previously established baseline used as a reference. Typically, the performance of the RF context-sensing arrangement depends on the accuracy of the established baseline. Baselines are defined for respective transmitter-receiver pairs of RF-sensing nodes in which one node acts as a transmitter for the RF presence sensing function and the other RF-sensing node acts as the receiver for that function. The baselines are thus associated to a given configuration of the RF-sensing nodes and of objects within a given sensing volume. In an exemplary case where with RF-sensing nodes at fixed positions, the baseline is established for an empty room, i.e. with no furniture. If at a later point in time, the current value of the predetermined RF-signal metric significantly deviates from the baseline, this disturbance can be assigned with great certainty to motion or presence of an object in the room. However, if the baseline has been established under "noisy" conditions, i.e. with the presence of movable objects in the room, such as, for instance, chairs, it is in principle harder to distinguish between current values of the RF-signal metric differing from the baseline due to a different arrangement of the objects within the sensing volume and due to the presence or motion of a living being within the sensing volume. Therefore, securing a reliable transmitter-receiver pair and a corresponding baseline is critical for the performance of the RF context-sensing arrangement.

In the context of the present invention, the term sensing volume refers to a predetermined space in which presence detection is to be performed, such as for example, a room, a parking lot or a section of a street. The actual sensed volume where presence is detectable depends on the position in which the RF-sensing nodes are arranged, as well as in the direction in which they transmit, and is, in a first approximation a sum of the individual sensed volumes associated to one or more transmitter-receiver pairs. In some cases, parts of the sensing volume are not covered by any sensed volume and detection of a context-situation, such as the presence of a person in such parts of the sensing volume is not possible using the RF context-sensing arrangement.

It is worth noting that the roles of transmitter and receiver discussed herewithin only apply to the RF presence sensing function. The RF-sensing nodes, which are typically communication nodes of a wireless communication network are capable of dynamically changing the roles of transmitter and receiver for performing the communication function. For instance, once a transmitter-receiver pair and the respective roles have been assigned, the RF-sensing nodes may continue to perform the intended communication function, but only those RF-signals provided by the RF-sensing node having the transmitter function and received by the RD-sensing node having the receiver function will be used for the RF-presence sensing function.

Figure 1A:
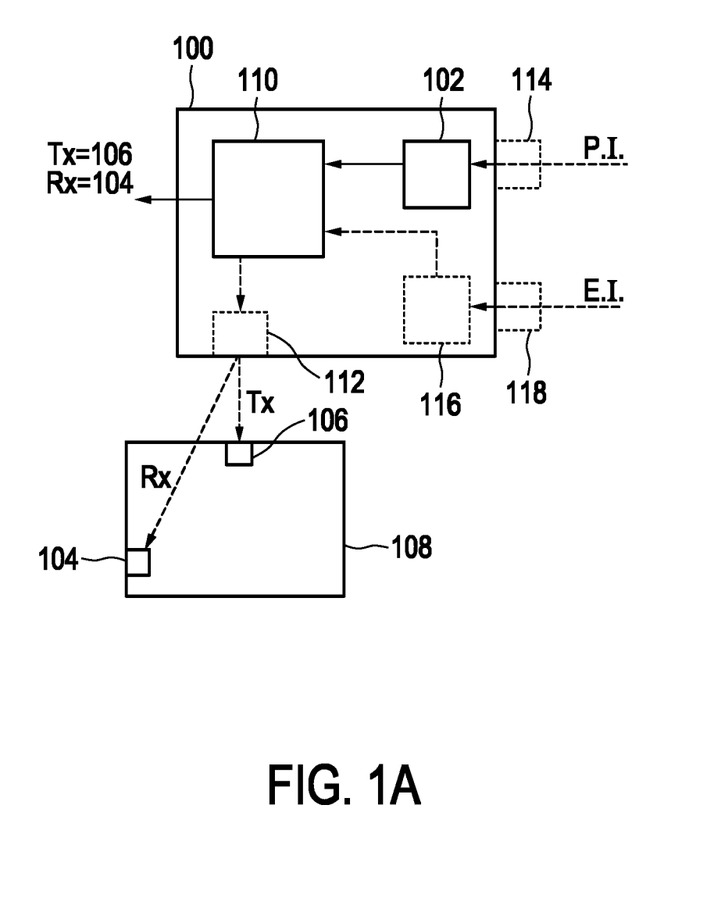
FIG. 1A shows a schematic block diagram of an embodiment of a pair-assignment device in communicating connection with a pair of RF-sensing nodes within in a sensing volume.

FIG. 1A shows a schematic diagram of a pair-assignment device 100 that is suitable for use in a RF context-sensing arrangement. The pair-assignment device comprises 100 a sensing-node position ascertainment unit 102 configured to ascertain position information P.I. pertaining to respective positions of RF-sensing nodes 104, 106 with respect to a predefined sensing volume, in this particular case, room 108. The pair-assignment device 100 further comprises a pair-assigning unit 110 that is connected to the sensing-node position ascertainment unit 102 and which is configured to assign, using the ascertained position information P.I. at least one transmitter receiver pair among the individual RF sensing nodes of the present sensing arrangement to perform an RF sensing function, to assign to the RF sensing nodes of the given transmitter receiver pair and transmitter role Tx and a receiver role Rx respectively, and to provide pair information indicative of the at least one assigned transmitter-receiver pair and the assigned transmitter and receiver roles. In this particular case, the pair-assigning unit assigns, based on the ascertained position information P.I. and on a predefined assignment algorithm, the transmitter role to RF-sensing node 106 and the receiver role to RF sensing node 104. As a non-limiting example, a given assignment algorithm is configured to provide transmitting roles to RF sensing nodes located at or close to a ceiling of the room and not to RF sensing nodes located close to the floor since these might be more easily blocked by objects in the room 108. This is due to the fact that, although RF-signals might transverse most objects, the relative attenuation they suffer is also a function of the distance between the transmitter of said RF signal and the interfering object. Therefore, an RF-signal transmitted from a RF-sensing node placed close to the object might be attenuated more, i.e., received by another RF-sensing node with a higher attenuation, than if the same object was placed further away. Thus, according to the previous example, the predefined assignment algorithm is configured to assign transmitter and receiver roles to the RF-sensing nodes of the transmitter-receiver pair taking into account a likelihood that objects are placed close to the RF-sensing nodes. For instance, transmitter-receiver pairs wherein the transmitter is an RF-sensing node, preferably a lighting node, located at or close to the ceiling might be more immune to variations in the positions of furniture as it is less likely that large objects will be placed under them, whereas in the RF-sensing nodes positioned on the walls it is more likely that objects such as wardrobes, chairs, coat hangers, etc., will be placed close to them.

For instance, and in accordance with an exemplary given predetermined assignment algorithm, if there are two RF-sensing nodes positioned at or close to the ceiling, two transmitter-receiver pair are assigned, one wherein the first RF-sensing node acts is assigned the transmitter role and the second RF-sensing node is assigned the receiver role, and a second wherein the first RF-sensing node acts is assigned the receiver role and the second RF-sensing node is assigned the transceiver role Optionally, as indicated by the dashed line, the pair-assignment device 100 may comprise an output unit 112 which is configured to provide an assigned pair signal indicative of the pair information. In the particular example of FIG. 1A the assigned pair signal is provided to the RF sensing nodes of the assigned transmitter receiver pair. This is particularly advantageous for RF context-sensing arrangements where the RF-sensing nodes are configured to determine a presence, i.e., comprise a context-determination unit configured to ascertain the current value of the predetermined RF-signal metric and, using the ascertained current value and a predetermined baseline, to determine the presence or not of a living being within the sensing volume associated to that transmitter-receiver pair. In this way, only those RF-sensing nodes assigned as a transmitter-receiver pair will perform the RF context-sensing function.

In an alternative example (not shown), the assigned pair signal is provided to an RF sensing arrangement control unit. This external RF sensing arrangement control unit is configured to store baselines for one or more transmitter-receiver pairs, to receive, current values of the predetermined RF-signal metric and to use for performing the RF context-sensing function, only that or those values associated to the transmitter-receiver pair assigned by the pair-assignment device 100. In an alternative RF-sensing arrangement, the RF sensing arrangement control unit receive detection signals from RF-sensing nodes configured to determine the presence or not of the living being and uses, for performing the RF context-sensing function, only those detection signals associated to the assigned transmitter-receiver pair, i.e., detection signals provided by the RF-sensing node having the receiver role in response to RF-signals received by the RF-sensing node having the transmitter role Additionally, or alternatively, the pair-assignment device 100 may also comprise an input unit 114 connected to the sensing node position ascertainment unit and configured to receive position-input data indicative of the position information. The position information may for instance be generated during a commissioning process where a respective position-related label is associated to the RF sensing nodes. In a particularly advantageous example the commissioning process requires the input of specific position information suitable for the assignment of transmitter receiver pairs according to a given assignment algorithm.

The pair-assignment device 100 may optionally comprise, as indicated by the dashed line and environment information ascertainment unit 116 that is configured to ascertain environment information E.I. pertaining to one or more objects present in the sensing volume 108. In this particular pair-assignment device, the pair-assigning unit is further connected to the environment information ascertainment unit and configured to assigned the at least one transmitter receiver pair and the transmitter and receiver roles also using the ascertained environment information. In a particular pair-assignment device, the environment information is received via an input unit 118, which is configured to configured to receive environment-input data indicative of the environment information E.I. The input unit 118 is in an exemplary pair-assignment device, a dedicated input unit different than input unit 114. However, in an alternative embodiment a single input unit is configured to receive both the environment-input data and the position-input data.

The environment information is, in a particular pair-assignment device, received from an external dedicated unit. The external dedicated unit can, for instance, obtain the environment information by analyzing a panoramic image of the predefined sensing volume, for example, a room. Alternatively, the external dedicated unit may comprise a 3D time-of-flight camera that enables a recognition of the objects in a room, with or without further input from a user via a suitable user interface, via which the user is able to assigned predetermined labels to the objects seen in an image, labels which are recognizable by the environment-information ascertainment unit.

Additionally, in another exemplary pair-assignment device, the environment-information ascertainment unit is further configured to ascertain intended-use information pertaining to an intended use of the sensing volume. In this particular pair-assignment device, the pair-assigning unit is further configured to assign the at least one transmitter-receiver pair and the transmitter and receiver role also using the intended-use information.

For instance, typical actions carried out in the predefined sensing volume, e.g., a given room, influence the assignment of transmitter-receiver pairs and transmitter and receiver roles among the respective transmitter-receiver pair. For instance, using RF-sensing nodes which are placed at chest height for the RF context-sensing function would provide an accurate detection. However, office spaces might have many monitors, laptops, piles of documents, table-lamps, etc., which can effectively block or negatively affect the RF-signals in a way detrimental for the RF context-sensing function. However, in office spaces, people tend to spend most of the time seated. Therefore, assigning a transmitter-receiver pair to RF-sensing nodes located close to the floor could potentially yield richer or more significant data for the RF presence sensing function.

Figure 1B:
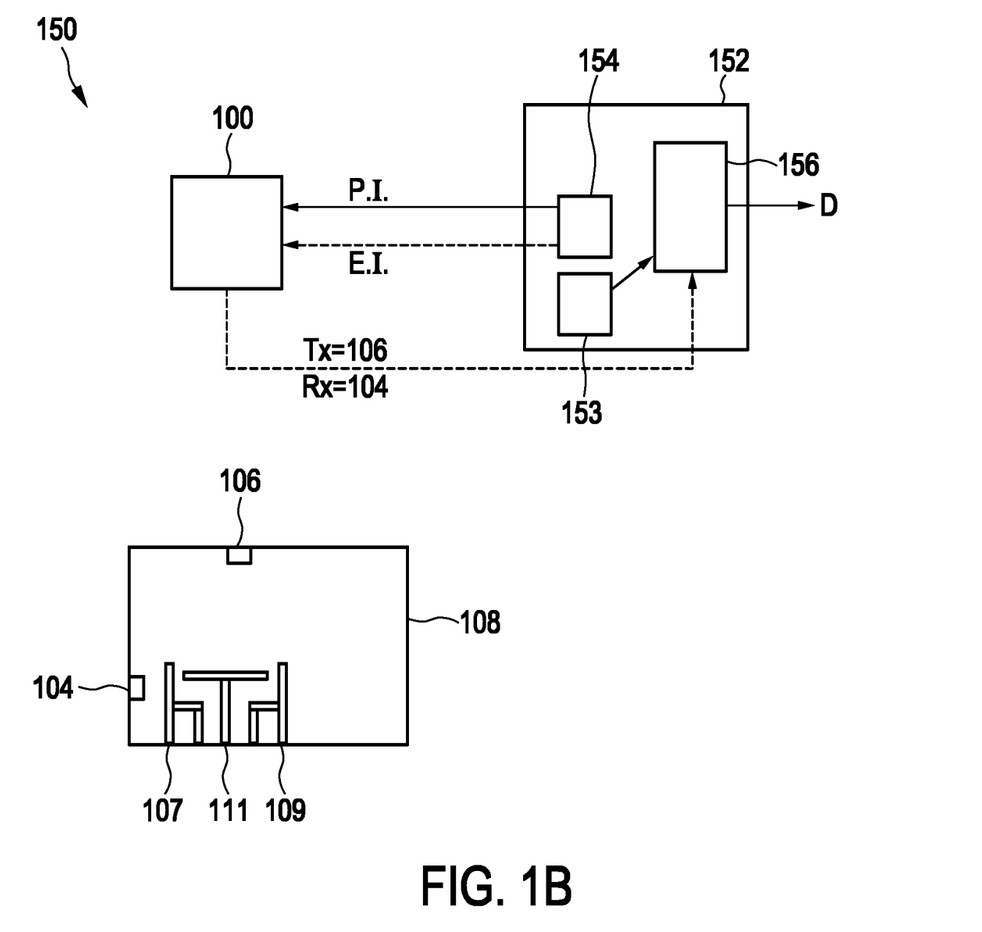
FIG. 1B shows a schematic of an embodiment of a RF context-sensing arrangement.

FIG. 1B shows an embodiment of an RF context-sensing arrangement 150 comprising a pair-assignment device 100 in communicating connection with context-sensing control device 152. The context-sensing control device 152 comprises a storage unit configured to store and provide to the pair-assignment device, the position information P.I. pertaining to respective positions of the RF-sensing nodes 104,106 with respect to the predefined sensing volume 108. For instance, the position information stored and provided may include information indicative of the RF-sensing node being positioned at a ceiling of room 108 and the RF-sensing node being positioned on a wall. Optionally, as indicated by the dashed line, the context-sensing control device 152 can also provide environment information E.I. pertaining to one or more objects, such as chairs 107 and 109 and table 111, eventually present in the sensing volume 108. The environment information can also be indicative of an intended use of the sensing volume, for instance an indication of the room 108 being an office.

The environment information can also comprise, for an exemplary pair-assignment device, metadata of a room or of the objects within it, such as furniture. For instance, the metadata is in a particular case indicative of the material or shape of the object. The presence of movable objects, like chairs, including a large metal frame is an indication that RF-sensing nodes located or possibly being located close to them could be less suitable for performing the RF context-sensing function, since they are more prone to be influenced by the reflecting surfaces of the metal frame. That is, a chair comprising metal that is moved might have a larger impact on the RF context-sensing function than a chair made of plastic, fabric or wood.

Similarly, the material of doors and windows, which might be left closed or opened can also be taken into account. The environmental information is, in an exemplary RF context-sensing arrangement provide by a dedicated software, such as, but not limited to LetsPlott home improvement software.

In another RF presence sensing arrangement, the environment information is indicative of heat-map highlighting how often a person is present in different sampling areas of the room. The more sampling areas, the more accurate the heat-map is. The pair-assignment device is advantageously configured to map the position of the RF-sensing nodes on the heat-map and to assign as a transmitter-receiver pair, at least those two RF-sensing nodes having the least probability of having a person in front of them and thus blocking or attenuating the RF-signal for the entire sensing volume. The heat-map is in an embodiment determined by direct measurements. Alternatively, it is estimated by 3D time-of-flight scans. For instance, RF-sensing nodes located above a door are good candidates for being assigned transmitter roles.

Based on the position information, and eventually also on the environment information received, the pair-assigning unit assigns to RF-sensing node 106 the role of a transmitter among the transmitter-receiver pair and to RF-sensing node 104 the role of a receiver. The pair-assignment device provides an assigned-pair signal indicative of the assignment to the context-sensing control device 152. The context-sensing control device additional comprises a context-determination unit 156 configured to receive the pair information and to determine, as explained above, the presence or not of a subject in the sensing volume 108 using a current value of a predetermined RF signal metric and a corresponding baseline that is stored in a baseline storage unit 153, that is configured to store, for the at least one transmitter-receiver pair, one or more baselines values associated thereto. It is worth noting, that two different RF-sensing nodes configured as transceivers give raise to two different transmitter-receiver pairs, depending on the assigned role, i.e., transmitter or receiver role.

Figure 2:
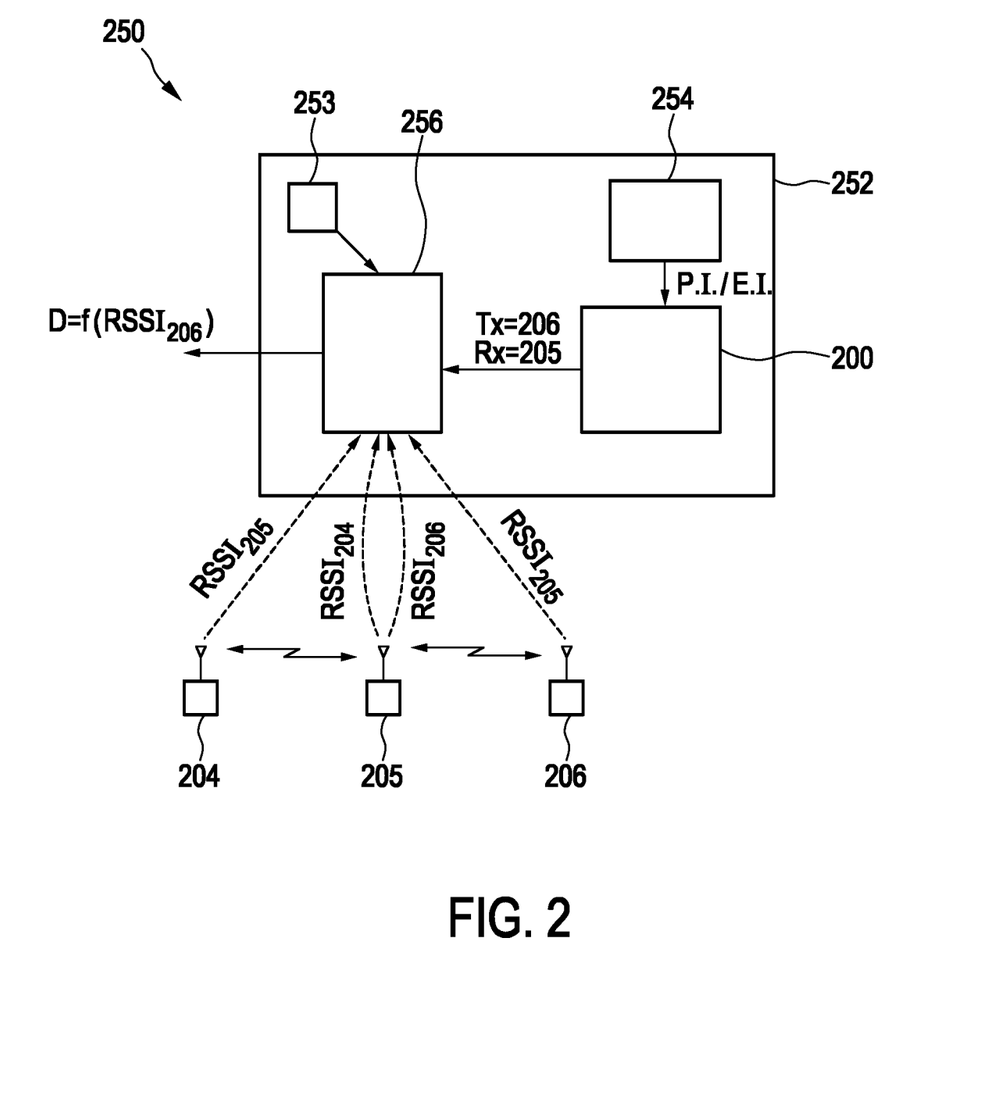
FIG. 2 shows a schematic of another embodiment of a RF context-sensing arrangement.

FIG. 2 shows a schematic block diagram of an embodiment of an RF context-sensing arrangement 250 wherein the context-sensing control device 252 comprises a pair-assignment device 200. The current discussion will focus on the differences between the RF context-sensing arrangement 150 of FIG. 1B and the RF presence sensing arrangement 250 of FIG. 2. Those features common to both RF context-sensing arrangements 150 and 250 will be referred to using the same numerals except for the first digit, which is "1" for the RF context-sensing arrangement 150 and "2" for the RF context-sensing arrangement 250.

The position information, and in some particular embodiments also the environment information is internally provided to the pair-assignment device 200, which is in this case implemented as a unit of the context-sensing control device 252. The pair information indicative of the assigned transmitter-receiver pair, which in this particular example is RF-sensing node 206 as transmitter with the transmitter role and RF-sensing node 205 as receiver with the receiver role, is internally provided to the context-determination unit 256. The context-determination unit 256 is, in this particular example, further configured to receive, from the RF sensing nodes 204 205 and 206, which are placed in the sensing volume, current RF-signal metric values that are influenceable by the presence of a person in the sensing volume. In this case, the predetermined RF-signal metric is a current received signal strength indication RSSI value. The RF-sensing nodes 204, 205 and 205 are configured to communicate wirelessly with respective neighboring nodes. The RF-sensing nodes are configured to determine a RSSI value of a given RF signal provided by a neighboring node and to provide this value to the context-determination unit 256. For example, RF-sensing node 204 provides the value $RSSI_{205}$ indicative of the signal strength of an RF signal provided by RF sensing node 205. Correspondingly, RF-sensing node 206 provides the value $RSSI'_{205}$ indicative of the signal strength of the RF signal provided by RF sensing node 205, which is also received by node 206. RF-sensing node 205, in turn, provides to the context-determination unit 256 the value $RSSI_{204}$ indicative of the signal strength of an RF signal provided by RF sensing node 204 and the value $RSSI_{206}$ indicative of the signal strength of an RF signal provided by RF sensing node 206.

The context-determination unit has further access to baselines corresponding to one or more pairs of RF-sensing nodes that are stored in the baseline storage unit 253. In particular, since the received pair information is indicative of RF-sensing node 206 being a transmitter and RF-sensing node being a receiver for the RF context-sensing function, the context-determination unit evaluates the $RSSI_{206}$ value, using the corresponding baseline and determines a presence or not of a person in the sensing volume based thereon.

Figure 3:
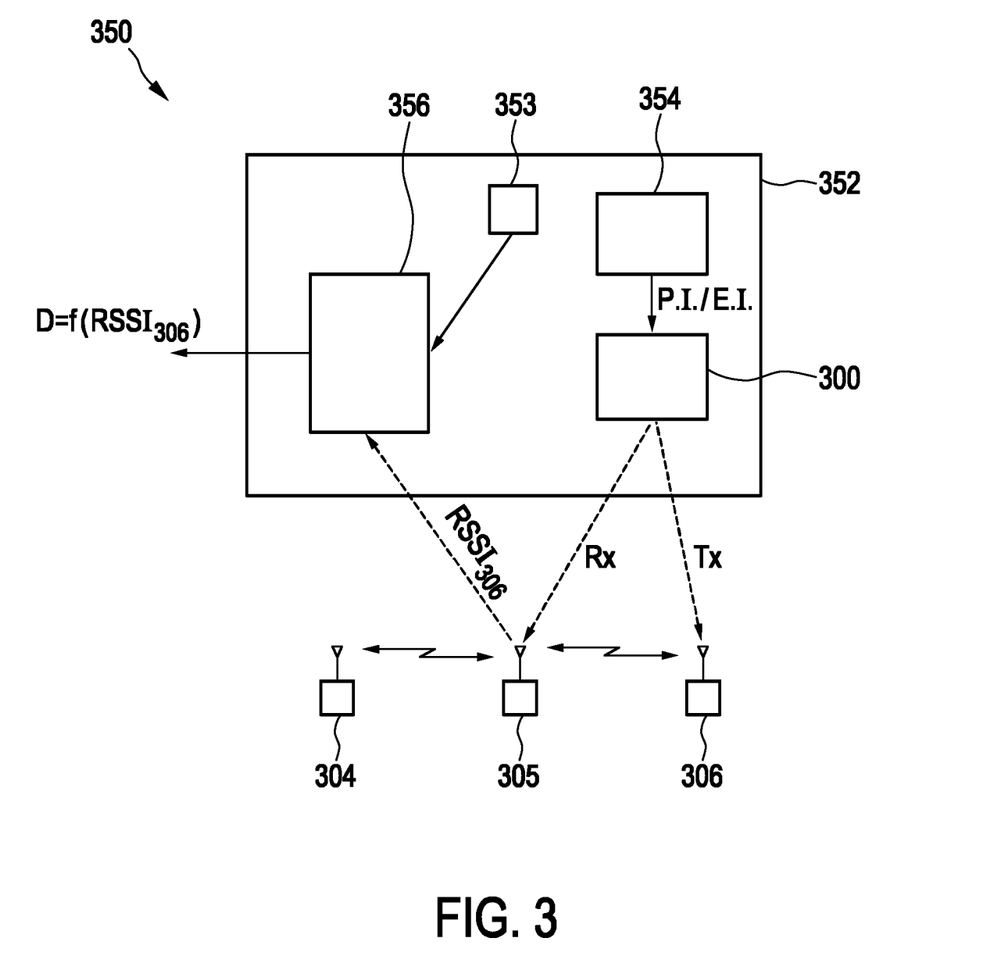
FIG. 3 shows a schematic of another embodiment of a RF context-sensing arrangement.

An alternative is shown in FIG. 3, which shows a schematic block diagram of another embodiment of an RF context-sensing arrangement 350. Here, again, those features common to RF context-sensing arrangements 150, 250 and 350 will be referred to using the same numerals except for the first digit, which is "1" for the RF context-sensing arrangement 150, "2" for the RF context-sensing arrangement 250, and "3" for the RF context-sensing arrangement 250. The RF context-sensing function is carried out in a slightly different way in the RF context-sensing arrangement 350. The pair-assignment device 300, which is in this case also integrated within the context-sensing control device 352, is configured to provide, via an output unit, an assigned-pair signal indicative of the pair information to the RF-sensing nodes. Therefore, RF-sensing node 306 is aware of its role as a transmitter for the RF context-sensing function. Correspondingly, RF-sensing node 305 is also aware of its role as a receiver and of the role of RF-sensing node 306 as a transmitter. When an RF-signal provided by RF-sensing node 306 is received at RF-sensing node 305, this node provides determines the RSSI value of the received RF-signal and provides it to the context-determination unit 356, which then uses this value, and a corresponding baseline stored in the baseline storage unit 353, for determining the presence or not of a person.

In alternative RF context-sensing arrangements, (not shown), the RF-sensing nodes themselves are configured to determine the RSSI value of signals received and, using stored baselines, to determine a flag, e.g. a binary flag indicative of a predetermined detection condition being fulfilled. The values of the respective flags are then provided to the context-determination unit, which in turn determines, based on the pair information provided by the pair-assignment device, which of the flags is to be used for the RF presence determination function.

Figure 4:
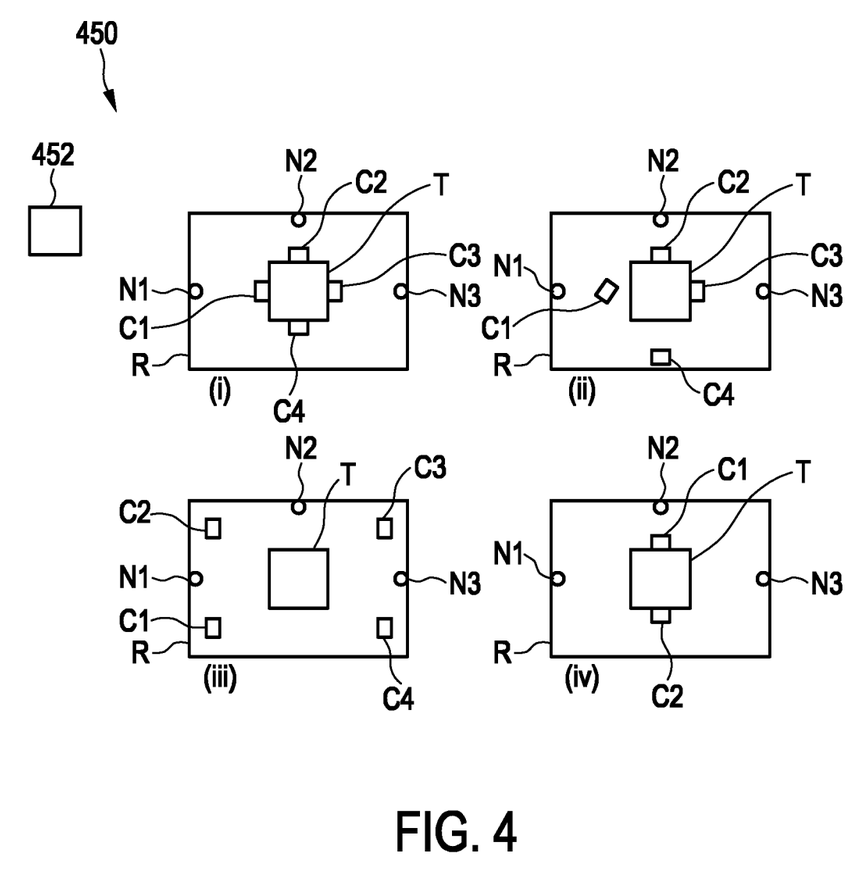
FIG. 4 shows a schematic of another embodiment of a RF context-sensing arrangement for ascertaining a plurality of baseline associated to a respective different room configuration (i)-(iv)

FIG. 4 shows a schematic diagram of a room R with a table T and chairs C1-C4 in different configurations at different points in time (i)-(iv). The room R has three RF-sensing nodes N1, N2 and N3, and together with context-sensing control device 452 form an RF context-sensing arrangement (450). To improve the reliability of the result of the RF context-sensing function, during a commissioning phase, several baselines are determined and stored for each possible transmitter-receiver pair. Each baseline is determined at a different point in time (i)-(iv) and is associated to a respective different position of the one or more objects present in the sensing volume. In this particular example, and for each of the 4 different points in time, the baseline storage unit, after the commissioning phase includes baselines for pairs N1-N2, N2-N1, N2-N3, N3-N2, N1-N3 and N3-N1, wherein in each pair the node named first would be the transmitter node and the node named second would be the receiver node, in the case the pair-assignment device assigns a corresponding transmitter-receiver pair. This means that each pair has four associated baselines, one for each of the four spatial configuration of the objects within the room R shown in FIG. 4. The different positions of the pieces of furniture will have an effect on the baseline determined in each case.

The detection determination unit of the presence sensing control device is advantageously configured, while performing the RF context-sensing function to determine a plurality of detection events using the signal quality value and a respective one of the plurality of stored baselines values associated to the transmitter receiver pair. The detection events are compared, eventually with predetermined weighing factors as a function of how likely each of the scenarios (i)-(iv) is to occur during an expected usage of the room R. The context-sensing control device 452 then determines whether a predetermined context-situation has occurred or is currently occurring, such as whether a subject is present in the sensing volume or not, using the plurality of determined detection events. For instance, some of the pairs of RF-sensing nodes and the respective baselines can be used as a back-up, such that, when in doubt, the RF presence sensing function can be complemented to confirm or reject a detection assumption.

Figure 5:
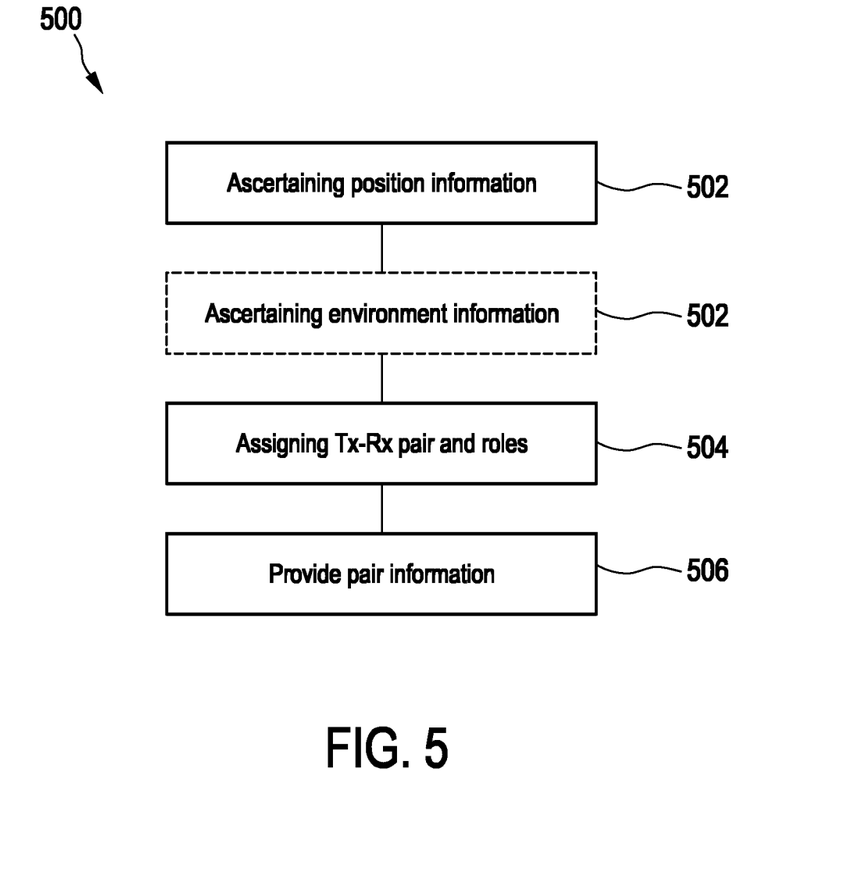
FIG. 5 shows a flow diagram of a method for controlling operation of a pair-assignment device.

FIG. 5 shows a flow diagram of a method for controlling operation of a pair-assignment device. The method comprises ascertaining, in a step 502, position information P.I. pertaining to respective positions of external RF-sensing nodes with respect to a predefined sensing volume of a RF context-sensing arrangement. The method 500 also comprises, in a step 504, assigning, using the ascertained position information, at least one transmitter-receiver pair among the individual RF-sensing nodes of the RF context-sensing arrangement to perform an RF context-sensing function and assigning to the RF sensing nodes of the given transmitter-receiver pair a transmitter role and a receiver role (Rx), respectively, and in a step 506, providing (506) pair information indicative of the at least one assigned transmitter-receiver pair and the assigned transmitter and receiver roles.

A particular method for controlling operation of a pair-assignment device further comprises, in a step 503, ascertaining environment-information pertaining to one or more objects present in the sensing volume. The step 503 is optional and therefore it is represented by a box with a discontinued line. In this particular method, step 504 involves assigning the at least one transmitter-receiver pair and the transmitter and receiver role also using the ascertained environment information.

Figure 6:
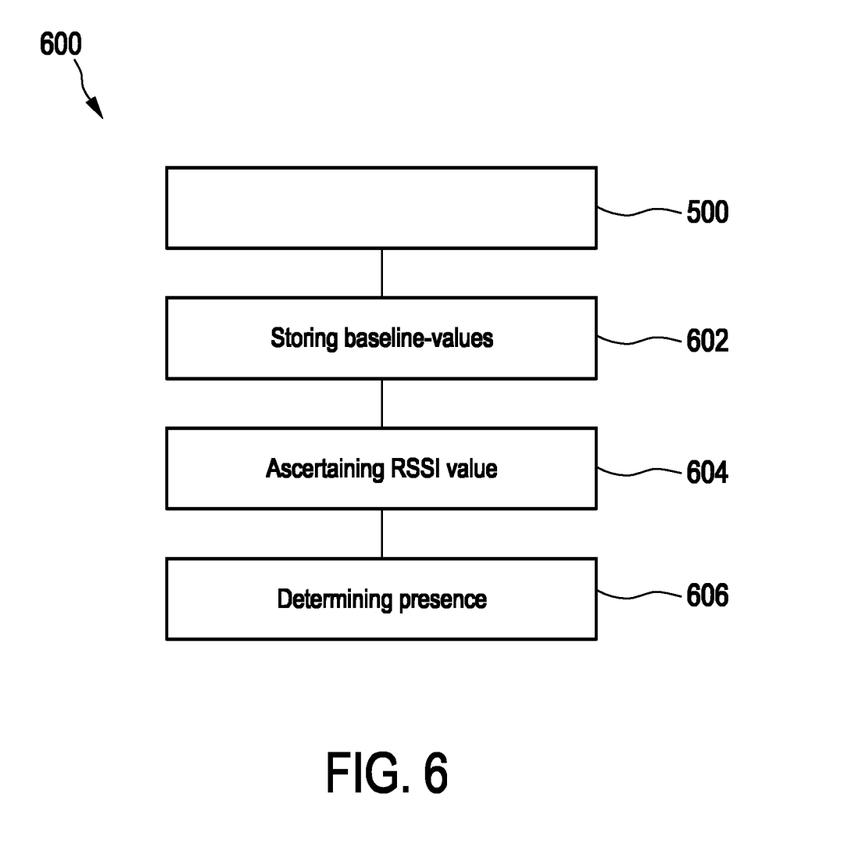
FIG. 6 shows a flow diagram of a method for controlling operation of a context-sensing control device.

FIG. 6 shows a flow diagram of a method for controlling operation of a context-sensing control device. The method comprises performing the steps of method 500 of FIG. 5. The method also comprises, in a step 602, for the at least one transmitter-receiver pair, a baseline associated thereto for performing the RF context-sensing function, ascertaining, in a step 604, a signal quality value indicative of a predetermined RF-signal metric of an RF-signal received by that RF-sensing node having the receiver role and sent by that RF-sensing node having the transmitter role, the RF-signal metric being influenceable by a presence of a living being in the sensing volume, and determining, in a step 606, whether a predetermined context-situation has occurred in the sensing volume, using the ascertained signal quality value and the corresponding baseline.

Figure 7:
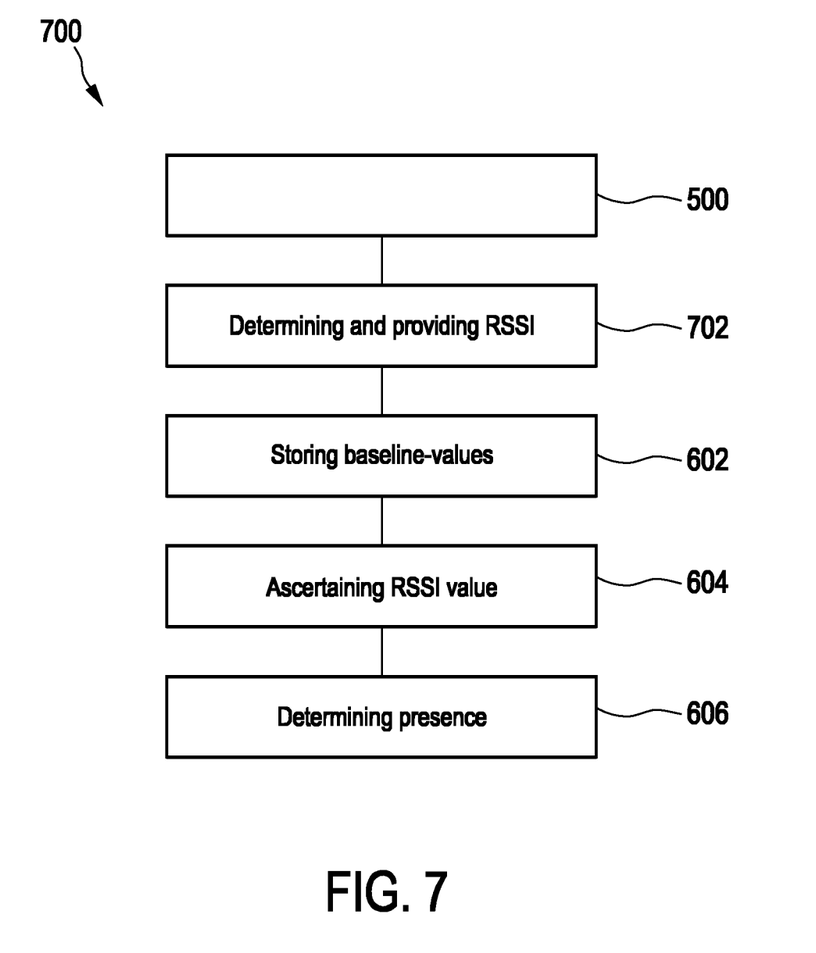
FIG. 7 shows a flow diagram of a method for controlling operation of an RF context-sensing arrangement.

FIG. 7 shows a flow diagram of a method for controlling operation of an RF context-sensing arrangement. The method comprises performing the method 500 of FIG. 5. The method also comprises determining and providing, in a step 702, a signal quality value indicative of a predetermined RF-signal metric of at least an RF-signal received by the RF-sensing node of the transmitter-receiver pair having the receiver function and provided by the RF-sensing node of the transmitter-receiver pair having the transmitter function. The method also comprises performing the steps 602, 604 and 606 described above with reference to FIG. 6.

In summary, the invention relates to a pair-assignment device comprising a sensing-node position ascertainment unit configured to ascertain position information pertaining to respective positions of external RF-sensing nodes with respect to a predefined sensing volume of a RF context-sensing arrangement and a pair-assigning unit configured to assign, using the ascertained position information, at least one transmitter-receiver pair among the individual RF-sensing nodes of the RF context-sensing arrangement to perform an RF context-sensing function, to assign to the RF sensing nodes of the given transmitter-receiver pair a transmitter role and a receiver role, respectively. The pair-assignment device then provides pair information indicative of the at least one assigned transmitter-receiver pair and the assigned transmitter and receiver roles and thus enables an increase of tolerance of the RF context-sensing arrangement against changes in the position of movable objects.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A context-sensing control device comprising:
   a pair-assignment device comprising:
   a sensing-node position ascertainment unit configured to ascertain position information pertaining to respective positions of external RF-sensing nodes with respect to a predefined sensing volume of a RF context-sensing arrangement; and
   a pair-assigning unit connected to the sensing-node position ascertainment-unit and configured:
   to assign, using the ascertained position information, at least one transmitter-receiver pair among the individual RF-sensing nodes of the RF context-sensing arrangement to perform a RF context-sensing function;
   to assign to the RF sensing nodes of the given transmitter-receiver pair a transmitter role and a receiver role, respectively; and
   to provide pair information indicative of the at least one assigned transmitter-receiver pair and the assigned transmitter and receiver roles; and
   wherein the pair-assignment device further comprising:
   an environment-information ascertainment unit configured to ascertain environment information pertaining to one or more objects present in the sensing volume; and
   wherein the pair-assigning unit is further connected to the environment-information ascertainment unit and configured to assign the at least one transmitter-receiver pair and the transmitter and receiver role also using the ascertained environment information;
   wherein the environment information is indicative of a material of which the one or more objects are made and confidence level of a possibility of the one or more objects being moved or static; and
   wherein context-sensing control device further comprises:
   a baseline storage unit configured to store, for the at least one transmitter-receiver pair, a baseline associated thereto;
   a context-determination unit connected to the baseline storage unit and to the pair-assignment device and configured to ascertain a signal quality value indicative of a predetermined RF-signal metric of an RF-signal received by that RF-sensing node having the receiver role and sent by that RF-sensing node having the transmitter role, the RF-signal metric being influenceable by a presence of a living being in the sensing volume and further configured to determine, using the ascertained signal quality value, and the corresponding baseline, whether a predetermined context-situation has occurred in the sensing volume.

2. The context-sensing control device of claim 1 further comprising an output unit configured to provide an assigned-pair signal indicative of the pair information.

3. The context-sensing control device of claim 1, further comprising an input unit connected to the sensing-node position ascertainment unit and configured to receive position-input data indicative of the position information.

4. The context-sensing control device of claim 1, wherein:
   the environment-information ascertainment unit is further configured to ascertain intended-use information indicative of an intended use of the sensing volume; and
   wherein the pair-assigning unit is further configured to assign the at least one transmitter-receiver pair and the transmitter and receiver role also using the intended-use information.

5. The context-sensing control device of claim 1, further comprising an input unit connected to the environment-information ascertainment unit and configured to receive environment-input data indicative of the environment-information.

6. The context-sensing control device of claim 1 wherein:
the baseline storage unit is further configured to store a plurality of baselines determined at different points in time and associated to a respective different position of the one or more objects present in the sensing volume and to a respective transmitter-receiver pair; and
wherein the detection determination unit is configured to determine a plurality of detection events using the signal quality value and a respective one of the plurality of stored baselines associated to the transmitter receiver pair and to determine whether a predetermined context-situation has occurred in the sensing volume using the plurality of determined detection events.

7. An RF context-sensing arrangement, comprising:
at least two RF-sensing nodes configured to transmit and receive RF-signals and to determine and provide a signal quality value indicative of a predetermined RF-signal metric of an RF-signal received by the respective RF-sensing node; and
the context-sensing control device according to claim 1.

8. A method for operating a context-sensing control device, the method comprising:
ascertaining position information pertaining to respective positions of external RF-sensing nodes with respect to a predefined sensing volume of a RF context-sensing arrangement;
assigning, using the ascertained position information, at least one transmitter-receiver pair among the individual RF-sensing nodes of the RF context-sensing arrangement to perform an RF context-sensing function and assigning to the RF sensing nodes of the given transmitter-receiver pair a transmitter role and a receiver role, respectively; and
providing pair information indicative of the at least one assigned transmitter-receiver pair and the assigned transmitter and receiver roles;
wherein the method further comprising:
ascertaining environment-information pertaining to one or more objects present in the sensing volume; and
assigning the at least one transmitter-receiver pair and the transmitter and receiver role also using the ascertained environment information;
wherein the environment information is indicative of a material of which the one or more objects are made and confidence level of a possibility of the one or more objects being moved or static.

9. A method for operating an RF context-sensing arrangement, the method comprising:
performing the method of claim 8;
determining and providing a signal quality value indicative of a predetermined RF-signal metric of at least an RF-signal received by the RF-sensing node of the transmitter-receiver pair having the receiver function and provided by the RF-sensing node of the transmitter-receiver pair having the transmitter function;
storing, for the at least one transmitter-receiver pair, a baseline associated thereto;
ascertaining a signal quality value indicative of a predetermined RF-signal metric of an RF-signal received by that RF-sensing node having the receiver role and sent by that RF-sensing node having the transmitter role, the RF-signal metric being influenceable by a presence of a living being in the sensing volume; and
determining, using the ascertained signal quality value, and the corresponding baseline, whether a predetermined context-situation has occurred in the sensing volume.

10. A non-transitory computer program comprising instructions which, when the program is executed by a computer, causes the computer to carry out the method of claim 8.

* * * * *